T. W. JOHNSON & A. W. GOODELL.
Apparatus for Making Tannin Extracts, &c.
No. 134,675. Patented Jan. 7, 1873.
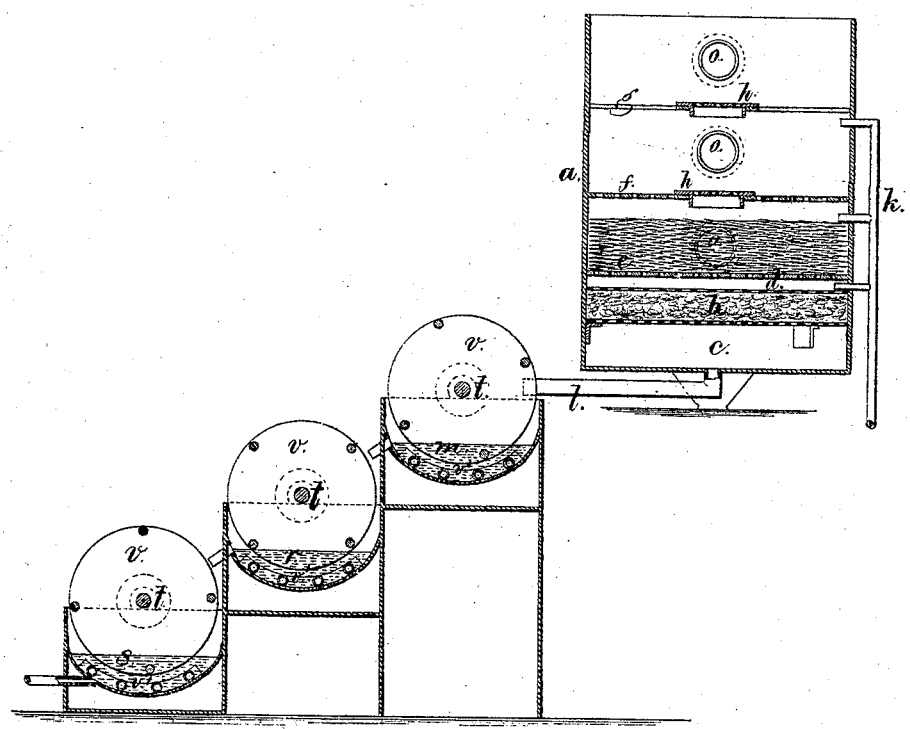
Witnesses,
Chas. H. Smith
Geo. P. Pinckney
Inventors
Thomas W. Johnson,
Anthony W. Goodell,
Lemuel W. Serrell
atty.

UNITED STATES PATENT OFFICE.

THOMAS W. JOHNSON AND ANTHONY W. GOODELL, OF NEW YORK, N. Y.

IMPROVEMENT IN APPARATUS FOR MAKING TANNIN EXTRACTS, &c.

Specification forming part of Letters Patent No. 134,675, dated January 7, 1873.

*To all whom it may concern:*

Be it known that we, THOMAS W. JOHNSON and ANTHONY W. GOODELL, of the city and State of New York, have invented an Improvement in Extracting Tannin, of which the following is a specification:

In extracting tannin from bark, foliage, and other vegetable matter difficulties have been experienced in obtaining the liquid in a sufficiently pure and concentrated form. This has arisen from the fact that when the vegetable material is placed in a deep vat the liquid will not percolate freely through the same because of the weight packing the mass too closely in the bottom portions. It is also found detrimental to agitate the tannin by repeated pumping.

Our improvements obviate the difficulties before named. We employ a leaching-vat containing perforated platforms for supporting the vegetable material in layers of suitable thickness one above the other, a trap-door being provided in each platform, through which the bark or vegetable material is introduced, and steam-supply pipes are introduced below each platform to warm the mass. Water is showered at the top and percolates down through the mass. At the bottom a filter is introduced for keeping back impurities. The liquid runs away from the lower part of the extractor into the upper concentrator, in which are steam-pipes to warm the liquid, and revolving disks, preferably of wood, to expose an extended surface for evaporation and concentration. From the first evaporator the liquid runs into a second concentrator, similar to the first, and so on, it being preferable to employ a number of moderately-small concentrators, and allow the operation to progress from one to the other as the liquid flows from the extractor.

In the drawing we have represented the improved apparatus by a vertical section.

The vat or extracting-vessel $a$ is of suitable size, according to the quantity of material to be operated upon; the height, however, is to be sufficient to insure the required strength in the tannin liquid that runs away. In the vessel $a$ is a filter, $b$, above the chamber $c$; and there is a chamber, $d$, between the filter and the first platform $e$, that is of slats or perforated. $f$ is the second platform, and $g$ the third platform. In these platforms $f$ and $g$ there are trap-doors $h$, that allow the ground bark or other vegetable matter to be introduced and spread upon the platform below. A space is left below each platform so that steam may spread uniformly throughout the mass of vegetable matter, such steam being introduced by the pipes $k$ in the proper quantity.

The bark or other vegetable matter, after being introduced, is to be steamed sufficiently to extract or soften the tannin, in order that the shower of water that is allowed to run upon the upper layer of the material and percolate down through the same may extract or wash out such tannin as rapidly as possible. The liquid in running through the filter $b$ is freed from particles of woody fiber and other impurities, and flows, by the pipe $l$, into the first concentrating-vessel $m$. We remark that after the desired amount of liquid has flowed through into the concentrators the pipe $l$ is to be closed by a cock, and the water that is employed to wash out any remaining traces of tannin is conveyed to a separate vessel, to be used in extracting the next charge. The refuse bark is emptied out, for convenience, through openings in the sides of the vessel $a$ after the covers $o$ have been removed.

Each concentrator $m\ r\ s$ is provided with a horizontal shaft, $t$, upon which are the disks $v$, preferably of wood, and the shafts and disks are revolved slowly by competent power. The concentrating-vessels are preferably made with round or half-cylinder bottoms, so that the liquid will all be equally acted upon by the evaporating-disks $v$. The liquid is heated by steam-pipes $v'$ to a temperature that will aid evaporation when exposed upon the disks $v$; but the temperature must not be sufficiently high to injure the tannin-extract. The liquid extract is to be allowed to run from one concentrating-vessel to the next through a suitable pipe and cock, so that the proper level will be maintained, especially in the lowest vessel, where the final concentration to the desired gravity is effected. The disks $v$ are provided with longitudinal connecting bars or traversers that move adjacent to the steam-pipes, and produce sufficient circulation to prevent the tannin liquid burning or being in jured by remaining too long in contact with the heated pipes.

We claim as our invention—

1. An apparatus for extracting tannin and other substances, composed of a series of perforated platforms that divide the mass up into layers, and steam-pipes supplying steam below the respective platforms, and a filter for detaining foreign particles, substantially as set forth.

2. The arrangement of two or more concentrating-vessels with revolving disks and steam-heating pipes, as shown, in combination with the extracting apparatus, as specified.

3. The concentrating apparatus, composed of a vessel with steam-pipes at the bottom, in combination with the revolving disks and longitudinal connecting-bars that act as stirrers, as set forth.

Signed by us this 23d day of September, A. D. 1872.

THOS. W. JOHNSON.
A. W. GOODELL.

Witnesses:
 GEO. T. PINCKNEY,
 CHAS. H. SMITH,